Sept. 3, 1935.    H. E. SIPE    2,013,071
FASTENING DEVICE
Original Filed July 19, 1927
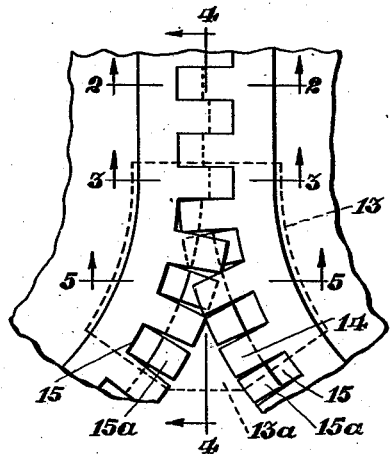
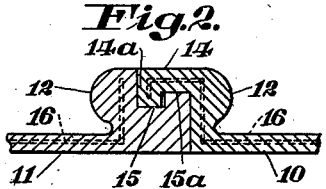
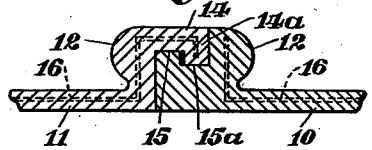
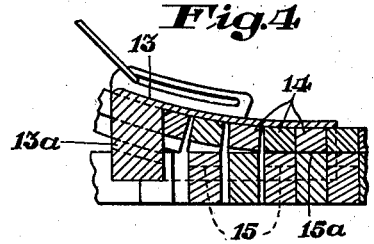
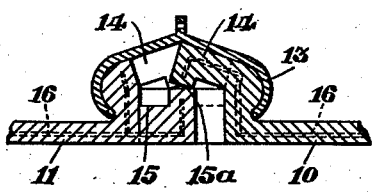
INVENTOR.
Harry E. Sipe
BY Kelley & Chisholm
ATTORNEY.

Patented Sept. 3, 1935

2,013,071

UNITED STATES PATENT OFFICE 2,013,071

FASTENING DEVICE

Harry E. Sipe, New York, N. Y., assignor to Hookless Fastener Company, a corporation of Pennsylvania Original application July 19, 1927, Serial No. 206,806. Renewed January 27, 1932, now Patent No. 1,929,083, dated October 3, 1933. Divided and this application September 1, 1933, Serial No. 687,799

5 Claims. (Cl. 24—205)

This invention relates to fastening devices and particularly to devices for quickly coupling and uncoupling the parts of wearing apparel, bags and the like, and is a division of my Patent No. 1,929,083, dated October 3, 1933.

One of the objects of the invention is to provide a fastener of this type which will be substantially continuous and smooth in appearance.

Another object is to provide an improved fastener which can be easily manufactured from non-metallic material.

A more specific object is to provide an improved fastener of the type described which can be readily molded from rubber and at the same time, provide interengaging portions which can be quickly separated by a slider.

Still further objects and advantages of the invention will appear during the following specification.

In the accompanying drawing I have shown for purposes of illustration one embodiment which my invention may assume in practice. In the drawing:

Fig. 1 is a plan view of a part of a device made according to my invention and indicating the method of coupling and uncoupling the same;

Fig. 2 is a section on the line 2—2 of Fig. 1;

Fig. 3 is a section on line 3—3 of Fig. 1;

Fig. 4 is a section on line 4—4 of Fig. 1; and

Fig. 5 is a section on line 5—5 of Fig. 1.

In Figs. 1 to 5 inclusive, I have shown a fastening device composed of two similar parts or pieces 10 and 11, said parts having on their adjacent faces, enlarged portions 12 having rounded outer faces to facilitate the movement of a slider 13 longitudinally of said parts. The adjacent faces of the enlarged portions 12 of said parts are provided with spaced projections in the form of hook-shaped members 14, the hook or offset portions 14a of which are adapted to enter sockets 15 in the other part as clearly seen in comparing Figs. 2 and 3 of the drawing. The term "recesses" is used herein to define the space between each series of projections 14. These recesses are of the same width as the projections. It will be noted that there are two series of interlocking members or projections arranged on each piece in adjacent parallel planes and that the projections on one series are in staggered relation to the projections on the other series in order to prevent transverse disengagement. In Fig. 2 the hook-shaped member 14 of the part 10 engages the socket 15 in the part 11, whereas in Fig. 3, the hook-shaped member 14 of the part 11 engages the socket 15 in the part 10. The shoulder portions 15a formed by the sockets 15 engage the hook parts 14a and while these members are comparatively thin in actual practice, the showing in the drawing is exaggerated for clearness, as is also the dimensions of the fastening device as a whole.

In coupling the parts 10 and 11 together by the slider 13 which is generally of conventional form, the hook members 14 are brought into the sockets 15 of the respective parts in the manner seen in Fig. 1 of the drawing. In order to couple the hook portions 14a with the shoulders 15a, the slider is provided with a spacing member 13a which holds the hook portions 14a in spaced relation with said shoulders until such time as the parts have been at least partially coupled together, after which the hook portions 14a will drop into the sockets 15 and the parts will be coupled together and retained against lateral displacement. It will be understood that the sockets 15 extend upwardly through the upper faces of the respective parts and are of the general form of the hook members 14 as clearly seen in Fig. 1 of the drawing. In like manner, when the parts are uncoupled, the spacing member 13a will serve to separate the hook members 14 and move them out of engagement with the sockets 15. Both parts 10 and 11 are preferably reinforced as seen at 16, and this reinforcement extends into the enlarged portions 12 of said parts as well as the hook members 14 thereof. The reinforcement may be in the form of fibrous or metallic material, being flexible, however, to permit of the free flexure of the separate parts of the device in the operation of coupling and uncoupling the same.

While I have shown and described in this application one embodiment which my invention may assume in practice, it will be understood that this embodiment is merely for the purposes of illustration and description and that various other forms may be devised within the scope of my invention as set forth in the appended claims.

What I claim as my invention is:

1. A fastening device of the class described comprising two pieces of flexible material, two series of interlocking members arranged on each of said pieces comprising two series of projections with recesses between the projections of each series, the projections and recesses of one series being staggered relative to the projections and recesses of the other series, the two series of projections on each piece lying in adjacent parallel planes, said projections being so formed as to extending into the recesses and interlock with the projections on the opposite piece.

2. A fastening device of the class described comprising two elongated parts composed of resilient material, each of said parts having two series of spaced apart projecting portions and sockets, the projecting portions and sockets of one series being in staggered relation to the other series of projecting portions and sockets and in a different plane, the projecting portions and sockets of each part being adapted to interlock respectively with the sockets and projecting portions of the opposite part.

3. A fastener of the class described comprising two elongated parts composed of resilient material, each of said parts having a series of spaced interlocking projecting portions and sockets intermediate the projecting portions formed of said resilient material, and a second series of interlocking projecting portions and sockets intermediate the same also formed of said resilient material disposed in a plane parallel to but adjacent to the plane of the first series of projecting portions and sockets.

4. A fastener of the class described comprising separate parts adapted to be coupled and uncoupled, each of said parts being composed of rubber, each part having two series of interlocking projecting portions with sockets intermediate the same, the projecting portions of the first series being staggered relative to the projecting portions of the other series and in an adjacent parallel plane, the projecting portions on each part adapted to overlap the projecting portions and interengaged with the sockets on the opposite part.

5. A fastening device of the class described comprising two continuous elongated and interlocking parts composed of flexible material, the adjacent edges of said parts each having two series of spaced projections formed of the material of said parts intermeshing and interlocking with corresponding series of projections on the opposite part, said series of projections on each part lying in adjacent parallel planes and the projections of one series being staggered relative to the projections of the other series, said projections being so formed as to mutually interlock when interengaged.

HARRY E. SIPE.